United States Patent
Hepburn et al.

(10) Patent No.: US 6,199,373 B1
(45) Date of Patent: *Mar. 13, 2001

(54) METHOD AND APPARATUS FOR DESULFATING A NO$_X$ TRAP

(75) Inventors: Jeffrey S. Hepburn; Garth M. Meyer, both of Dearborn; Joseph R. Asik, Bloomfield Hills, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/396,162

(22) Filed: Sep. 14, 1999

Related U.S. Application Data

(63) Continuation of application No. 08/921,074, filed on Aug. 29, 1997, now Pat. No. 5,974,788.

(51) Int. Cl.[7] .................................................. F01N 3/00
(52) U.S. Cl. .................................. 60/274; 60/285; 60/276
(58) Field of Search ............................ 60/274, 285, 276, 60/286, 295, 297; 123/443, 300, 481, 325

(56) References Cited

U.S. PATENT DOCUMENTS

| | | |
|---|---|---|
| 3,696,618 | 10/1972 | Boyd et al. . |
| 3,708,980 | 1/1973 | Truxell . |
| 3,927,525 | 12/1975 | Jacobs . |
| 4,006,722 | 2/1977 | Hata et al. . |
| 4,033,122 | 7/1977 | Masaki et al. . |
| 4,036,014 | 7/1977 | Ariga . |
| 4,056,931 | 11/1977 | Hata . |
| 4,106,448 | 8/1978 | Noguchi et al. . |
| 4,215,542 | 8/1980 | Kobayashi et al. . |
| 4,261,170 | 4/1981 | Suzuki . |
| 4,793,135 | 12/1988 | Obstfelder et al. . |
| 5,250,268 | 10/1993 | Geiger . |
| 5,402,641 | 4/1995 | Katoh et al. . |
| 5,457,290 | 10/1995 | Sase et al. . |
| 5,473,890 | 12/1995 | Takeshima et al. . |
| 5,517,820 | 5/1996 | Kuroda et al. . |
| 5,657,625 | * 8/1997 | Koga et al. ............................ 60/274 |
| 5,746,049 | 5/1998 | Cullen et al. . |
| 5,758,493 | 6/1998 | Asik et al. . |
| 5,771,685 | 6/1998 | Hepburn . |
| 5,832,722 | 11/1998 | Cullen et al. . |
| 5,974,788 | * 11/1999 | Hepburn et al. ........................ 60/274 |

* cited by examiner

Primary Examiner—Thomas Denion
Assistant Examiner—Binh Tran
(74) Attorney, Agent, or Firm—Allan J. Lippa

(57) ABSTRACT

A method and apparatus for desulfating a NO$_x$ trap is proposed wherein the SO$_x$ purge temperature is achieved by modulating the amplitude of the A/F of the mixture supplied to the engine thereby storing oxygen in the trap during lean engine cylinder events and generating the required exotherm during rich engine cylinder events.

12 Claims, 4 Drawing Sheets

METHOD AND APPARATUS FOR DESULFATING A $NO_x$ TRAP

CROSS-REFERENCE TO RELATED APPLICATION

This application is a continuation of application Ser. No. 08/921,074, filed on Aug. 29, 1997, now U.S. Pat. No. 5,974,788.

TECHNICAL FIELD

This invention relates to exhaust after-treatment and, more particularly, to a method and apparatus for removing contaminants accumulated in a $NO_x$ trap.

BACKGROUND ART

Lean burn engines usually operate at an air/fuel ratio (A/F) $\geq$ 18 to obtain improved fuel economy. However, the usual three-way catalyst (TWC) is most efficient at approximately stoichiometry, (A/F=14.65). Accordingly, it has been proposed to locate a $NO_x$ trap downstream of the TWC to store $NO_x$ during lean A/F operation and subsequently converting the $NO_x$ to $N_2$ and $O_2$ by operating the engine at a rich A/F. This $NO_x$ conversion occurs within an optimum temperature window of approximately 300° C. to 400° C. The trap is preferably located underbody so that during hard, wide-open throttle (WOT) driving, the trap temperature does not exceed 800° C. The temperature of the three-way catalyst should not exceed approximately 1000° C.

When operating with fuel containing contaminants such as sulfur, an accumulation of the contaminants in the trap causes a decrease in the amount of $NO_x$ the trap can absorb. The contaminants must be "burned" off or desorbed at temperatures $\geq$ 675° C. and with an A/F $\leq$ 14.65 (rich). A previous method of raising the temperature of the trap from its usual operating temperature of approximately 300° to 400° C. to a temperature of at least 675° C., employs secondary air injection. This approach to $SO_x$ purging or desulfation of contaminants is expensive. Another approach to the problem employs a split exhaust manifold, separated TWC, or separated exhaust pipes, as proposed in copending application Ser. No. 764,185 filed Dec. 13, 1996 and assigned to the assignee of the present invention.

SUMMARY OF THE INVENTION

In accordance with the present invention, contaminant purging is accomplished by modulating the amplitude of the A/F at a properly chosen frequency to create a substantial temperature increase in a lean $NO_x$ trap, positioned downstream of a TWC. The A/F ratio modulation period and amplitude are such that $O_2$, HC and CO breakthrough occurs in the TWC (i.e., incomplete catalytic conversion), and relatively complete catalytic reaction of $O_2$, HC, and CO occurs in the trap, generating the required exotherm.

BRIEF DESCRIPTION OF THE DRAWINGS

A more complete understanding of the present invention may be had from the following detailed description which should be read in conjunction with the drawings in which.

DETAILED DESCRIPTION OF PREFERRED EMBODIMENT

Figure 1:
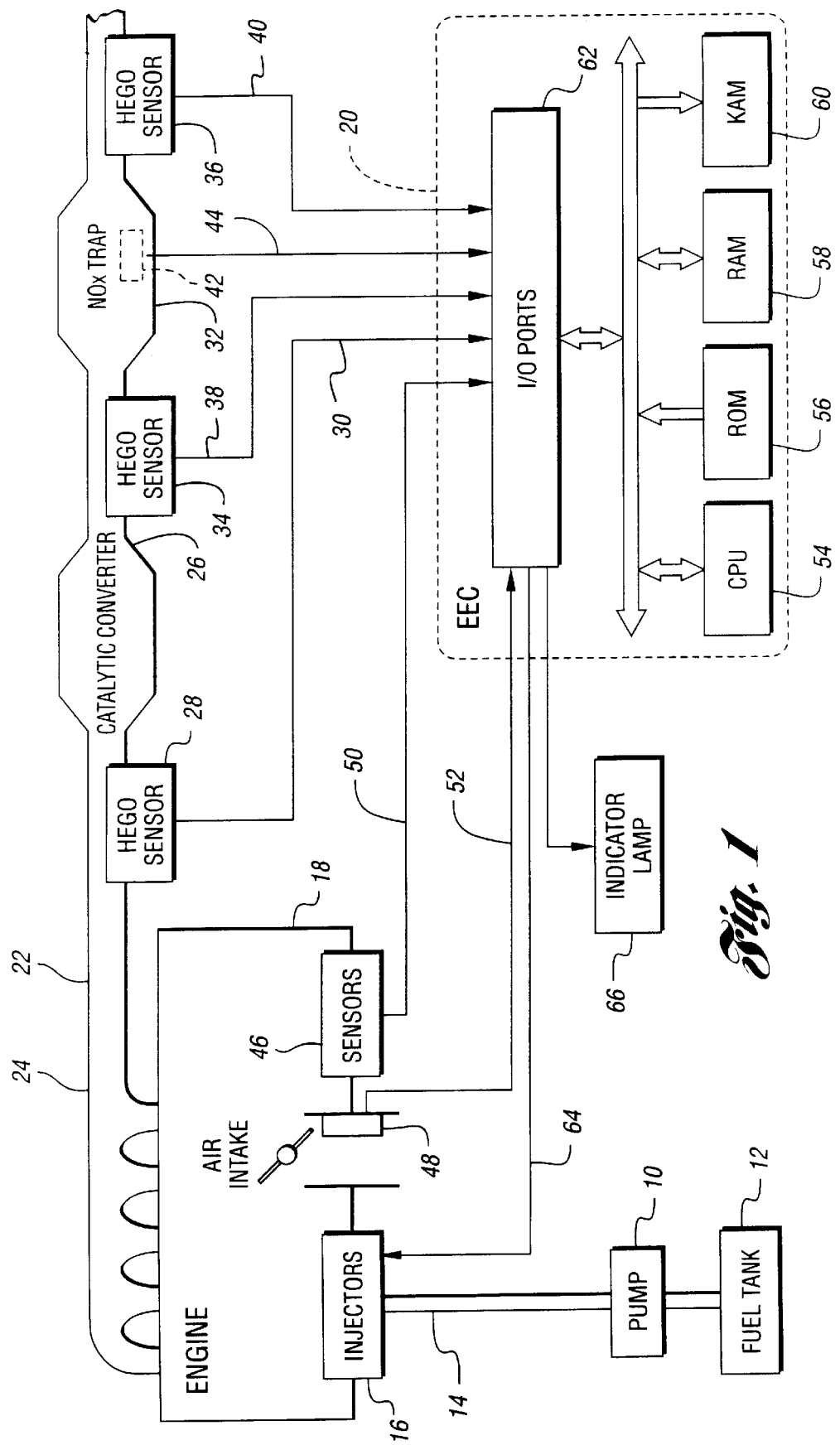
FIG. 1 shows a block diagram of the trap desulfation system of the present invention.

Referring now to the drawings and initially to FIG. 1, a block diagram of the present invention is shown. A fuel pump 10 pumps fuel from a tank 12 through a fuel line 14 to a set of injectors 16 which inject fuel into an internal combustion engine 18. The fuel injectors 16 are of conventional design and are positioned to inject fuel into their associated cylinder in precise quantities as determined by an electronic engine controller (EEC) 20. The fuel tank 12 contains liquid fuels, such as gasoline, methanol or a combination of fuel types.

An exhaust system 22, comprising one or more exhaust pipes and an exhaust flange seen at 24, transports exhaust gas produced from combustion of an air/fuel mixture in the engine to a conventional three-way catalytic converter (TWC) 26. The converter 26 contains catalyst material that chemically alters the exhaust gas to generate a catalyzed exhaust gas. A heated exhaust gas oxygen (HEGO) sensor 28, detects the oxygen content of the exhaust gas generated by the engine 18, and transmits a representative signal over conductor 30 to the EEC 20. A $NO_x$ trap 32 is located downstream of the converter 26 for trapping nitric oxide contained in the exhaust gas exiting the converter. A HEGO sensor 34 detects the oxygen content of the exhaust gas upstream of the trap 28 while a HEGO sensor 36 detects the oxygen content of the exhaust gas downstream of the trap 28. The sensor 34 and 36 transmits signals over respective conductors 38 and 40 to the EEC 20. The $NO_x$ trap 32 contains a temperature sensor 42 for measuring the midbed temperature which is provided to the EEC 20 over the conductor 44. Alternatively, the midbed temperature may be estimated using a computer model.

Still other sensors, indicated generally at 46, provide additional information about engine performance to the EEC 20, such as crankshaft position, angular velocity, throttle position, air temperature, etc. over conductor 50. The information from these sensors is used by the EEC 20 to control engine operation.

A mass air flow sensor 48 positioned at the air intake of engine 18 detects the amount of air inducted into an induction system of the engine and supplies an air flow signal over conductor 52 to the EEC 20. The air flow signal is utilized by EEC 20 to calculate a value that is indicative of the air mass flowing into the induction system in lbs./min.

The EEC 20 comprises a microcomputer including a central processor unit (CPU) 54, read only memory (ROM) 56 for storing control programs, random access memory (RAM) 58, for temporary data storage which may also be used for counters or timers, and keep-alive memory (KAM) 60 for storing learned values. Data is input and output over I/O ports generally indicated at 62, and communicated internally over a conventional data bus generally indicated at 64. The EEC 20 transmits a fuel injector signal to the injectors 16 via signal line 64. The fuel injector signal is varied over time by EEC 20 to maintain an air/fuel ratio determined by the EEC 20. An indicator lamp generally indicated at 66 is controlled by the EEC 20 to provide an indication of the condition of the $NO_x$ trap 32 as determined by input data from the various sensors.

The program stored in ROM 58 implements an air/fuel strategy where the engine is operated in lean mode or relatively high air to fuel ratio (A/F) for fuel economy under certain engine speed/load conditions. The TWC 26 operates at temperatures between 400 and 1000° C. for good efficiency and durability. The trap 32 operates in a window of 300 to 400° C. for good efficiency. If the fuel contains sulfur, sulfur tends to deposit in the trap, reducing its $NO_x$ trapping efficiency and the ultimate conversion of $NO_x$ to harmless nitrogen and oxygen within the trap. To purge the trap of sulfur, the trap must be heated to approximately 650° C. The purging operation typically requires 3 to 10 minutes at that temperature. During the lean mode, $NO_x$ and $SO_x$ accumulates in the $NO_x$ trap. After substantially total sorption of the trap 32, the purging operation is carried out. After purging is completed the EEC usually returns to the lean mode of operation.

In accordance with the present invention an exotherm of sufficient temperature rise is created in the trap 16 by modulation of the air-fuel mixture supplied to the engine cylinders through manipulation of the fuel injection quantities.

raise the $NO_x$ trap temperature to the desox (desulfation) temperature of 650° C. With the TWC positioned upstream of the $NO_x$ trap, larger A/F amplitudes are required in order to exceed the oxygen storage capacity of the TWC and hence create lean and rich breakthrough into the $NO_x$ trap. By judicious selection of the A/F amplitude and frequency, a portion of the exothermic temperature rise can be made to take place directly in the $NO_x$ trap rather than totally in the upstream TWC. Although symmetric is modulation was discussed above, asymmetric modulation, in which the half-periods of the lean and rich modulation events are different, may be used in generating the exotherm.

The system design forces HC, CO, AND $O_2$ breakthrough in the TWC. This permits chemical energy to be transported from the exit of the TWC, through the exhaust pipe, to the trap. The design objective for the trap is to promote chemical reactions of HC, CO, and $O_2$, which create an exotherm in the trap and raise its temperature. Preferably, breakthrough in the trap is minimized. The system design meets the

TABLE 1

A/F Modulation Schedule

| Stroke Cyl. 1 | | P | E | I | C | P | E | I | C | P | E | I | C | P | E | I | C | P | E | I | C |
|---|---|---|---|---|---|---|---|---|---|---|---|---|---|---|---|---|---|---|---|---|---|
| Cylinder | 1 | L | L | L | L | L | L | L | L | L | L | R | R | R | R | R | R | R | R | R |
| Cylinder | 3 | L | L | L | L | L | L | L | L | L | L | R | R | R | R | R | R | R | R | R |
| Cylinder | 4 | L | L | L | L | L | L | L | L | L | L | R | R | R | R | R | R | R | R | R |
| Cylinder | 2 | L | L | L | L | L | L | L | L | L | L | R | R | R | R | R | R | R | R | R |
| | | | | | | | | | | ← τ → | | | | | | | | | | | |

Table 1 shows an example of a typical fuel injection pattern. For this pattern, all cylinders are operated lean (L) for 10 events and all cylinders are operated rich (R) for 10 events. The resulting modulation period is equal to 20 engine events. The period can be chosen to be a fixed number of events or a fixed time τ. For the latter case, the number of engine events varies with engine speed (rpm). Typical periods may vary from two engine events to several seconds. The engine events are designated at P for power stroke, E for exhaust stroke, I for intake stroke, and C for compression stroke. The engine events are referenced to TDC of cylinder number 1. The engine cylinder firing order is 1342.

Figure 2:
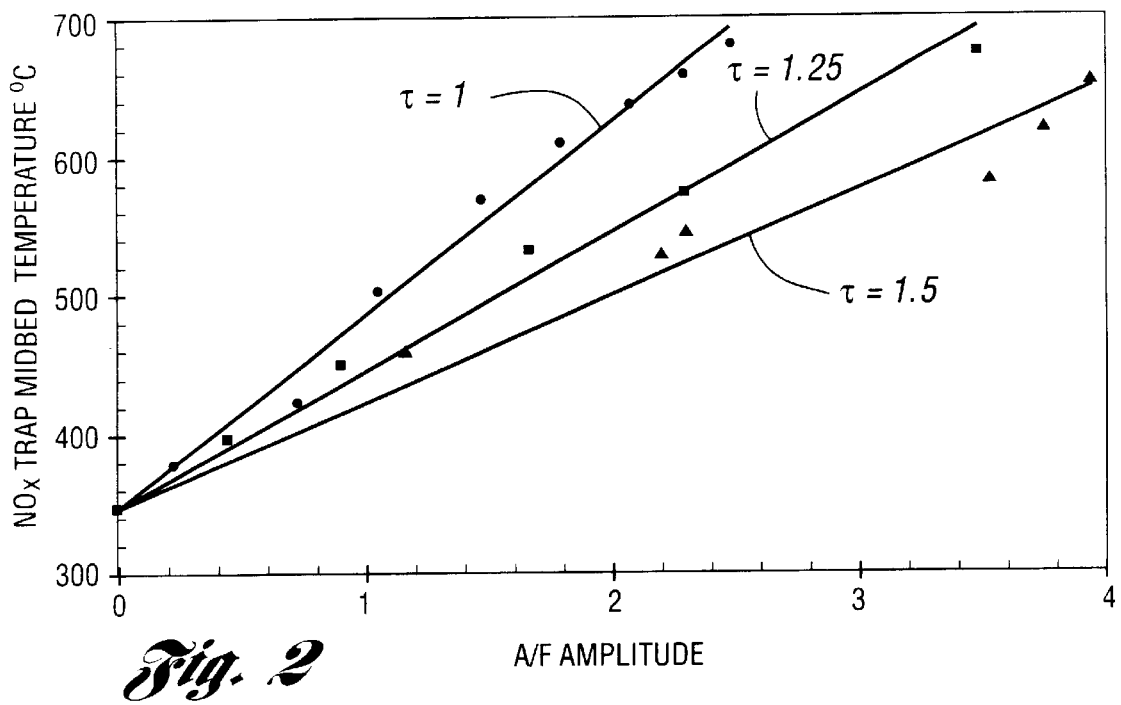
FIG. 2 is a graph of $NO_x$ trap midbed temperature vs. the A/F amplitude vs. the A/F modulation period.
Figure 3:
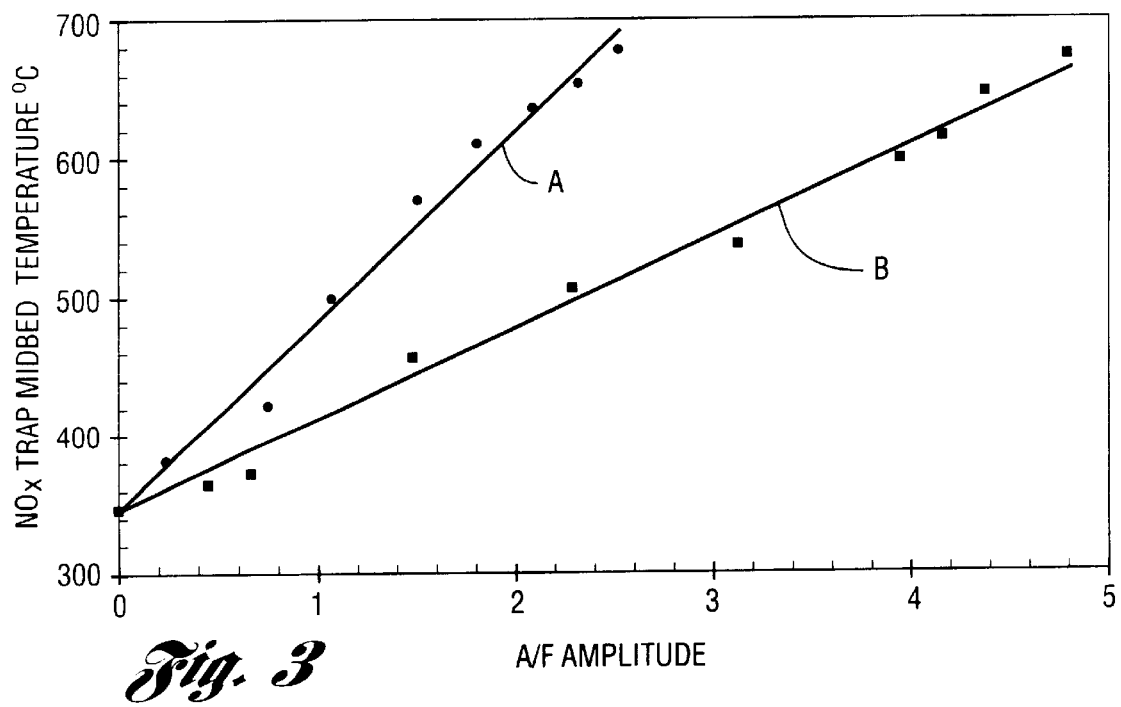
FIG. 3 is a graph comparing $NO_x$ trap midbed temperature vs. A/F amplitude with and without a three way catalyst in the exhaust path.

FIGS. 2 and 3 demonstrate the attainment of midterm temperatures near 700° C. within a lean $NO_x$ trap through the application of the A/F modulation technique. These results were obtained using a laboratory pulse flame combustor where the inlet gas to the $NO_x$ trap was preheated and controlled to 350° C. In both instances the A/F amplitude was varied between 0 and either 4 or 5 A/F units. For example, given a mean A/F of 14.5 (i.e., stoichiometry), an A/F amplitude of 4 units results in modulation between a lean A/F of 18.5 and a rich A/F of 10.5. FIG. 2 illustrates the effect of A/F modulation amplitude and frequency on the exothermic temperature rise for a $NO_x$ trap with no TWC located upstream from the trap. The highest rate of exothermic temperature rise was obtained with a modulation period of 1 second (τ=1.0). For a fixed A/F modulation period of 1 second, FIG. 3 compares the case where there is no TWC upstream of the $NO_x$ trap (graph A) to the case where a TWC and $NO^x$ trap are placed in series (graph B). Without an upstream TWC, a $NO_x$ midbed temperature of approximately 650° C. is achieved for an A/F modulation amplitude of 2. With a TWC positioned upstream of the $NO_x$ trap, an A/F modulation amplitude of 4.5 was required in order to following conditions: The combination of engine mass air flow and A/F modulation saturates the oxygen storage capacity of the TWC and approximately saturates the oxygen storage capacity of the trap. The rate at which the TWC and trap $O_2$ storage sites fill with $O_2$ is proportional to the product of engine mass air flow and the $O_2$ concentration. For lean A/F, the $O_2$ concentration is proportional to the difference between the exhaust A/F ratio and the stoichiometric A/F (typically 14.5).

The A/F ratio modulation period τ may be chosen to be large with respect to the time necessary to fill the $O_2$ storage sites in the TWC and small with respect to the time necessary to fill the $O_2$ storage sites in the trap. The filling time is inversely proportional to the engine mass flow rate and the $O_2$ concentration. The latter is proportional to the A/F ratio modulation span.

The oxygen storage capacity of the TWC and trap can be varied through well known methods. The concentration of cerium in the washcoat can be changed and the physical size of the TWC and trap can be changed. Increasing both parameters tends to increase the oxygen storage. The oxygen storage capacity of the trap (C2) is significantly greater than the oxygen storage capacity of the TWC (C1). C1 is minimized so that most of the exotherm occurs in the trap rather than the TWC.

During the desulfation process, the A/F ratio and spark advance are controlled. The A/F ratio span determines the exotherm in the trap, as discussed. However, the spark advance is preferably controlled to avoid power surges and sags during the desulfation. During the lean A/F desulfation event, the spark advance is adjusted to MBT. During the rich desulfation event, the spark advance is retarded. The desulfation process is started with lean modulation, to store oxygen in the trap. After the trap's oxygen storage capacity is attained, the A/F is switch rich. During the rich half of the event, a catalytic exotherm is generated in the trap, raising its temperature. After the temperature reaches the desired temperature, say 650° C., and remains at the desired temperature for a prescribed time during which the A/F is biased rich, the desulfation event is terminated.

Figure 4:
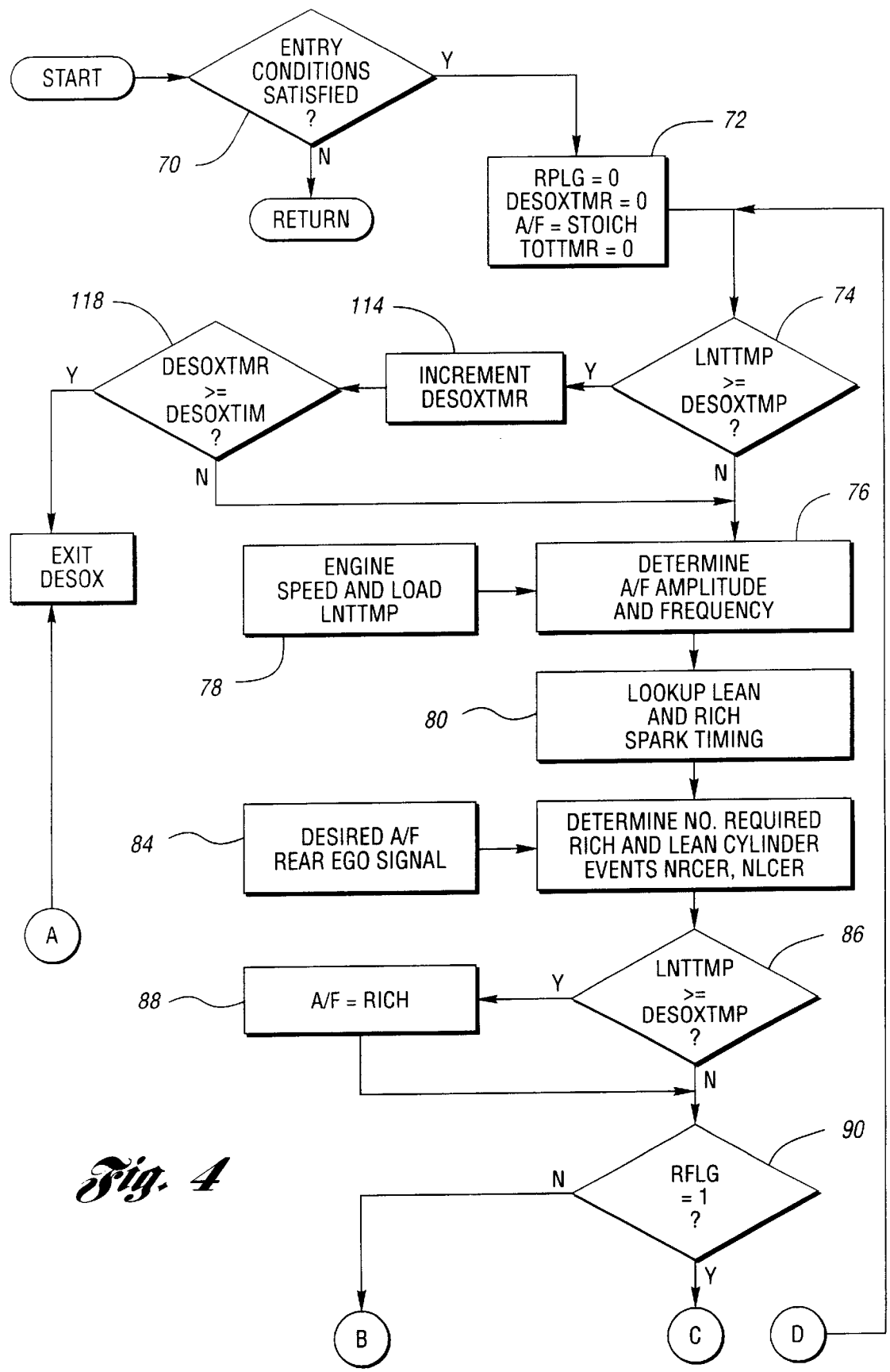
FIGS. 4 and 4b are a flowchart of the trap desulfation method of the present invention.
Figure 4B:
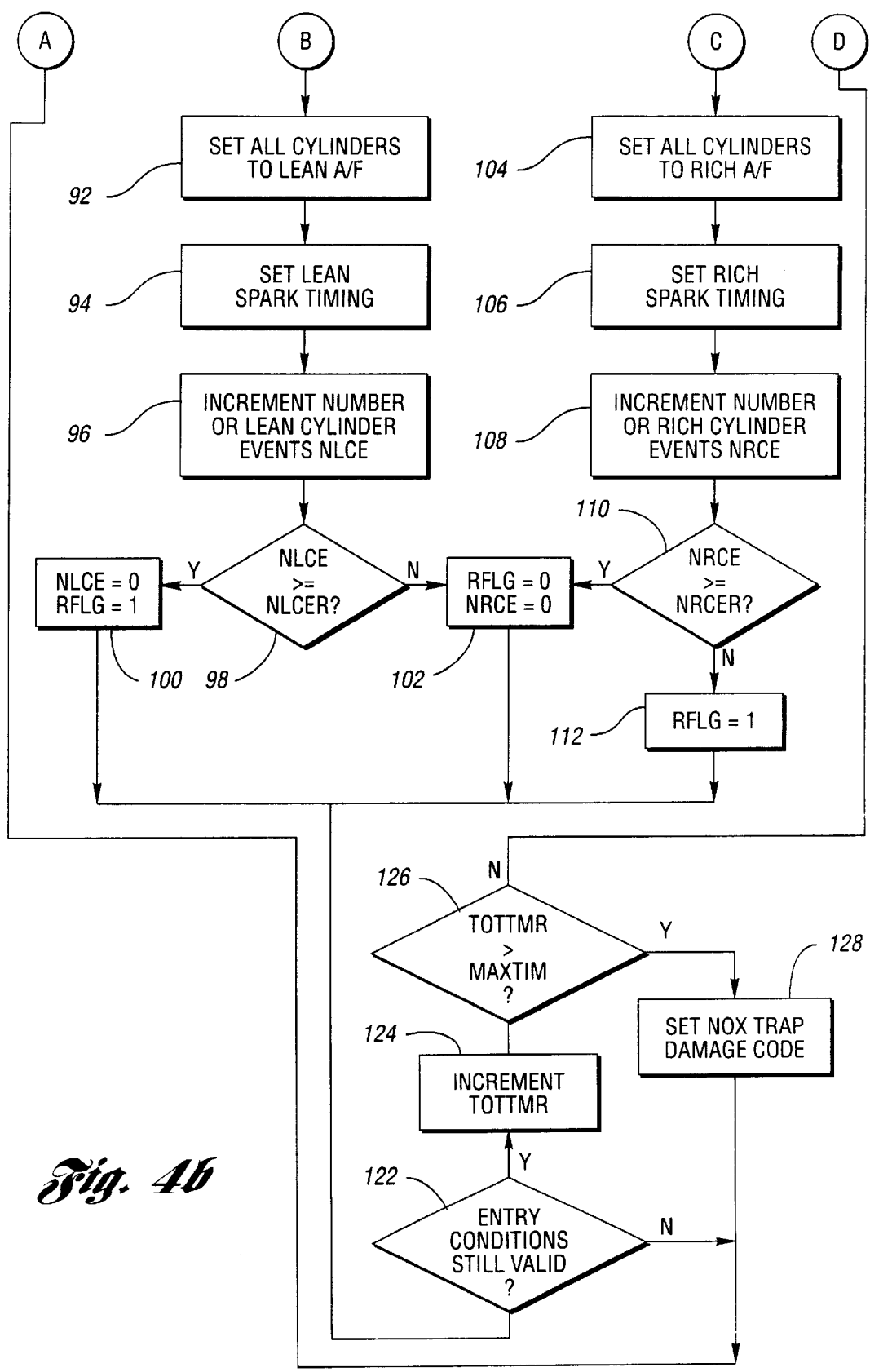

Referring now to FIG. 4, a flowchart of the desulfation process is shown. When desox entry conditions exist as determined by the block 70, a rich flag RFLG, and timers DESOXTMR and TOTTMR are reset and the A/F is set to stoichiometric as indicated in initialization block 72. Desox entry conditions may be based on the difference between lean to rich switching times of the upstream and downstream HEGO sensors as described in copending application FMC0769 filed, assigned to the assignee of the present invention. Other well known criteria for estimating when the trap must be purged of $SO_x$ may also be used. At block 74 the trap temperature LNTTMP is compared with a predetermined desired desox temperature DESOXTMP of, for example, 650° C. LNTTMP may be obtained from a thermocouple or modeled. After the comparison step at block 74, the amplitude and frequency of A/F modulation is determined at block 76 based on engine speed and load and LNTTMP as input from block 78. The engine speed and load are the open loop components used in determining the modulation of the A/F necessary to arrive at the desired exotherm. The trap temperature provides a feedback component used in trimming the value of the amplitude and frequency determined from speed and load. At block 80 the desired spark timing to balance the engine torque for the respective lean and rich modulation periods is determined from previously obtained experimental data stored in look up tables. At block 82 the required number of rich cylinder events (NRCER) and lean cylinder events (NLCER) is determined based on the frequency of the A/F modulation and the engine speed. The required number of event determined at block 82 are adjusted to achieve a desired A/F of approximately stoichiometry as indicated by the rear ego signal input provided from block 84. If the trap temperature is below the desired desox temperature DESOXTMP as determined at block 86, then the rich flag RFLG is checked at block 90. The first time through this DESOX loop the flag is reset at block 72 and accordingly a lean A/F is applied to all cylinders as indicated at block 92. The spark timing is set at block 94, to the value determined at block 80, and a counter (NLCE) is incremented at block 94 to record the number of lean cylinder events that have occurred. This number is compared at block 98 with the number of lean cylinder events required (NLCER) as determined in block 82. When the events counted are equal to or greater than the number required, the rich flag RFLG is set and the counter (NLCE) is reset at block 100. Until this occurs RFLG and a counter (NRCE) for counting the number of rich cylinder events are reset at block 102 each lean cylinder event.

When the rich flag RFLG is set at block 100, a rich A/F mixture will be supplied to all cylinders the next time though the loop, as indicated at block 104. The rich spark timing value is set at block 106 and the counter NRCE is incremented at block 108 and compared at block 110 with the number of cylinder events required (NRCER). The rich flag is set at block 112 until the number of cylinder event is equal to or greater than the number required. At that time the flag RFLG and the counter NRCE are reset at block 102. Thus, when purge mode entry conditions are met, the amplitude of the A/F is modulated to raise the temperature of the trap to the desired $SO_x$ purging temperature DESOXTMR. When the trap temperature is equal to or greater than DESOXTMP as determined at block 86, the A/F is biased to the rich side as indicated at block 88. This biasing may be accomplished by increasing the number of rich cylinder events relative to the number of lean cylinder events or otherwise supplying a relatively rich mixture to the engine over each modulation period to thereby purge the trap. This relatively rich A/F mixture is supplied for a time interval DESOXTIM. A timer DESOXTMR is incremented at block 114 each time through the loop while the trap temperature is equal to or greater than DESOXTMP, as determined at block 74, and compared with DESOXTIM at block 118. When the trap temperature has been equal to or greater than DESOXTMP for the time interval DESOXTIM the program is exited at 120.

At block 122 a check is made to determined whether the entry conditions still exists. If not the program is exited prior to expiration of DESOXTIM. If so, a timer TOTTMR is incremented each time through the loop at block 124 and compared with fixed maximum time MAXTIM at block 126. When MAXTIM is exceeded, trap damage is assumed and a diagnostic code is set at block 128 and the program is exited. The indicator lamp 66 (FIG. 1) is illuminated to provide an indication that the damage code has been set.

Thus, we have described a control system design where modulation of A/F mixture supplied to the engine cylinders is provided to produce substantial exotherms in a lean $NO_x$ trap situated downstream of a conventional TWC, thereby raising the temperature of the trap and allowing a purging of $SO_x$ from the trap.

While the best mode for carrying out the present invention has been described in detail, those familiar with the art to which this invention relates will recognize various alternative designs and embodiments for practicing the invention as defined by the following claims.

What is claimed is:

1. A method of operating a motor vehicle having an engine supplied with a mixture of fuel and air and having a catalytic element located in an exhaust path of the engine, said method comprising a sequence of the following steps:

detecting conditions requiring catalytic element desulfation;

amplitude modulating the A/F of the mixture supplied to the engine to repeatedly switch the A/F between a lean and a rich mixture to create an exotherm in said catalytic element upon detection of said conditions to thereby raise the temperature of said catalytic element to a predetermined desulfation temperature; and performing a desulfation operation when said predetermined temperature is reached.

2. The invention defined by claim 1 wherein said catalytic element is a trap, the conditions detected are indicative of a decline in trap efficiency, and wherein the exotherm created by the amplitude modulation raises the trap temperature to approximately 650° C.

3. The method defined in claim 1 wherein said modulating step:

provides a lean A/F mixture to all cylinders of said engine over a number of lean cylinder events to store oxygen in said catalytic element; and provides a rich A/F mixture to all cylinders of said engine over a number of rich cylinder events to generate a catalytic exotherm in said catalytic element.

4. The method defined in claim 3 wherein the modulation has amplitude and frequency that is a function of engine speed and load.

5. The method defined in claim 4 wherein the amplitude and frequency of the modulation is trimmed as a function of trap temperature.

6. The method defined in claim 3 wherein half-periods of lean and rich modulation events are the same.

7. The method defined in claim 3 wherein half-periods of lean and rich modulation events are different.

8. The invention defined by claim 1 wherein said catalytic element is a $NO_x$ catalyst.

9. The invention defined by claim 1 wherein said catalytic element is a hydrocarbon catalyst.

10. Engine control apparatus comprising:

a catalytic element located in the exhaust passage of a multi-cylinder engine, a computer that is programmed to;

detect conditions that indicate the catalytic element should be purged of accumulated $SO_x$;

amplitude modulate the A/F of the mixture supplied to the engine to repeatedly switch the A/F between a lean and a rich mixture to create an exotherm in said catalytic element upon detection of said conditions to thereby raise the temperature of the catalytic element to a predetermined desulfation temperature; and bias modulation toward a rich A/F when the catalytic element reaches said desulfation temperature to purge the catalytic element of $SO_x$.

11. An article of manufacture comprising:

a computer storage medium having a computer program encoded therein for causing the computer to control a multi-cylinder engine with a $NO_x$ trap located in an exhaust passage thereof, said computer program comprising:

code for causing the computer to detect degraded tray efficiency resulting from $SO_x$ accumulation, and code for causing the computer to amplitude modulate the A/F of the mixture supplied to the engine between a lean and a rich mixture upon detection of said degraded trap efficiency to control the temperature of the catalytic element; and code for causing the computer to adjust spark advance during modulation of the A/F to prevent engine torque imbalance.

12. A method of operating a motor vehicle having au engine supplied with a mixture of fuel and air and having a $NO_x$ trap located in an exhaust path of the engine, said method comprising a sequence of the following steps:

detecting trap efficiency reduction due to $SO_x$ accumulation;

amplitude modulating the A/F of the mixture supplied to the engine between a lean and a rich mixture as a function of engine speed and load in response to detection of said trap efficiency reduction to raise the temperature of said trap to a predetermined temperature;

adjusting engine spark timing during the lean and rich portions of the modulation period to prevent engine torque imbalance;

trimming the amplitude and frequency of the modulation as a function of trap temperature;

purging the trap of $SO_x$ when said predetermined temperature is reached; and terminating the purging of said trap when a predetermined purge criteria is met.

* * * * *